United States Patent
Arroyo et al.

(10) Patent No.: US 12,264,622 B2
(45) Date of Patent: Apr. 1, 2025

(54) GAS TURBINE AIR BLEED ARRANGEMENT WITH AN INLET

(71) Applicant: GKN Aerospace Sweden AB, Trollhättan (SE)

(72) Inventors: Carlos Arroyo, Trollhättan (SE); Hans Mårtensson, Trollhättan (SE); Mattias Billson, Trollhättan (SE)

(73) Assignee: GKN AEROSPACE SWEDEN AB, Trollhättan (SE)

( * ) Notice: Subject to any disclaimer, the term of this patent is extended or adjusted under 35 U.S.C. 154(b) by 0 days.

(21) Appl. No.: 18/008,469

(22) PCT Filed: Jun. 25, 2021

(86) PCT No.: PCT/EP2021/067481
§ 371 (c)(1),
(2) Date: Dec. 6, 2022

(87) PCT Pub. No.: WO2021/260173
PCT Pub. Date: Dec. 30, 2021

(65) Prior Publication Data
US 2023/0203987 A1    Jun. 29, 2023

(30) Foreign Application Priority Data
Jun. 26, 2020    (GB) .................................. 2009749

(51) Int. Cl.
*F02C 6/08* (2006.01)
*F02C 7/24* (2006.01)

(52) U.S. Cl.
CPC .................. *F02C 6/08* (2013.01); *F02C 7/24* (2013.01); *F05D 2240/127* (2013.01);
(Continued)

(58) Field of Classification Search
CPC .... F02C 6/08; F02C 7/24; F02C 7/185; F02C 7/045; B64D 2013/0622;
(Continued)

(56) References Cited

U.S. PATENT DOCUMENTS 5,059,093 A    10/1991  Khalid et al.
9,890,711 B2*  2/2018   Urban .................. F04D 29/545
(Continued)

FOREIGN PATENT DOCUMENTS

EP    1074694 A2    2/2001
EP    2527618 A2    11/2012

OTHER PUBLICATIONS

International Search Report and Written Opinion for PCT/EP2021/067481 mailed Oct. 5, 2021 (10 pages).

*Primary Examiner* — Todd E Manahan
*Assistant Examiner* — Rodolphe Andre Chabreyrie
(74) *Attorney, Agent, or Firm* — Sheppard Mullin Richter & Hampton LLP

(57) ABSTRACT

A gas turbine engine comprises at least one radially extending bleed passage optionally in fluid communication with at least one generally circumferentially extending plenum. The passage has an upstream inlet in fluid communication with a bleed passage and an outlet for releasing air from the plenum. The upstream leading edge of the inlet or the downstream trailing edge of the inlet has a non-uniform profile.

20 Claims, 7 Drawing Sheets

(52) U.S. Cl.
CPC .... *F05D 2250/184* (2013.01); *F05D 2250/51* (2013.01); *F05D 2260/606* (2013.01); *F05D 2260/963* (2013.01)

(58) Field of Classification Search
CPC ....... B64D 2033/0226; F05D 2260/963; F05D 2260/606; F05D 2250/51; F05D 2250/184; F05D 2240/127
See application file for complete search history.

(56) References Cited

U.S. PATENT DOCUMENTS

| | | | |
|---|---|---|---|
| 2016/0031290 A1* | 2/2016 | Molin | B60H 1/00564 165/44 |
| 2016/0053686 A1* | 2/2016 | Labrecque | F01D 17/105 137/15.2 |
| 2016/0169034 A1* | 6/2016 | Clarkson | F02C 7/05 415/177 |
| 2017/0335771 A1* | 11/2017 | Post | F02C 3/04 |
| 2018/0171804 A1 | 6/2018 | Friedrich et al. | |
| 2019/0360398 A1* | 11/2019 | Qiu | F02C 7/14 |
| 2021/0394917 A1* | 12/2021 | Klovdahl | B64D 33/02 |

\* cited by examiner

GAS TURBINE AIR BLEED ARRANGEMENT WITH AN INLET

CROSS-REFERENCE TO RELATED APPLICATIONS

This application is a national stage of, and claims priority to, Patent Cooperation Treaty Application No. PCT/EP2021/067481, filed on Jun. 25, 2021, which application claims priority to Great Britain Application No. GB2009749.9, filed on Jun. 26, 2020, which applications are hereby incorporated herein by reference in their entireties.

BACKGROUND

A conventional gas turbine engine comprises an air intake, a series of compressors, a combustor, a turbine and an exhaust outlet. The operation of a conventional gas turbine engine will be understood by a person skilled in the art and will not therefore be described in detail.

Aero-acoustic resonance of an engine bleed system or other cavity, such as, for example, a plenum, can be dangerous for the rotating turbomachinery as the generated fluctuating pressure waves can lead to engine/component failure. Resonance can also generate noise but that is a secondary concern.

In respect of this secondary concern, aircraft noise is an important aspect of aircraft design and increasing demands are placed on aircraft manufacturers to reduce noise emissions to comply with increasing noise restrictions at airports and environmental constraints. If resonance can be reduced or prevented then associated noise caused by resonance can be prevented.

In order to prevent the stall of a compressor in different engine operating conditions a bleed passage may be provided, typically within the duct between the low/intermediate and high pressure compressors. The bleed passage is arranged to release air out of the primary (core) flow path so as to divert air away from the compressors under certain operating conditions and to prevent a compressor stall. This allows gas turbine engines to continue operating at a wide range of operating conditions.

The air released through the bleed passage may be communicated into a radially extending chamber or chambers (each being called a bleed plenum). Each plenum collects air before it is released into the bypass duct which surrounds the engine core. Each plenum provides a volume to receive the air which has been diverted from the engine core.

However, when there is little or no release of air through the bleed passage the high speed air passing through the primary flow path interacting with the entry or inlet of the bleed passage can create unsteady flow phenomena which may induce undesirable aero-acoustic effects in the bleed passage and/or bleed plenum in the form of fluctuating pressure waves due to resonance. These pressure waves can be damaging to the compressor and other structures. In order to prevent these damaging pressure waves from appearing, as described herein, the inventors have established that the geometry of the plenum can be advantageously designed such that the aero-acoustical resonance of the plenum does not occur in the engine operating range.

SUMMARY

The present disclosure relates to a gas turbine engine of the type used in aircraft, including without limitation commercial aircraft. An air-bleed arrangement is described that can reduce/weaken flow phenomena that can result in aero-acoustic resonance of an engine bleed system or other cavity, such as, in one example, a plenum.

Viewed from a first aspect, there is provided herein a gas turbine engine or engine component with a duct including at least one generally radially extending bleed passage in fluid communication with an outlet for releasing air from the duct, wherein the bleed passage has an inlet in fluid communication with a duct of the engine and is defined between an upstream leading edge and downstream trailing edge, measured in a direction of flow of air through the duct, and wherein the upstream leading edge of the inlet or the downstream trailing edge of the inlet has a non-uniform profile.

By making modifications as described herein to the way in which air flows over the bleed opening in the duct of the engine, it is possible to avoid noise and potentially damaging vibrations. The noise and vibrations may be caused by the high speed air entering the bleed passage and/or passing over the entrance to the bleed passage. Counterintuitively the inventors have established that, by replacing smooth and uniform surfaces which would ordinarily form the intersection of the engine duct and the bleed passage (i.e. the perimeter or periphery of the inlet to the bleed passage) with unsmooth or non-uniform surfaces, acoustic resonance can be avoided.

Specifically, by providing the upstream edge (the leading edge) and/or the downstream edge (the trailing edge) with a surface that is not uniform or smooth, vortices which would otherwise be generated can be blended to avoid resonance occurring.

The term 'non-uniform' is intended to refer to a surface that is not smooth and uniform in shape such as conventional straight line or curve that forms conventional or existing inlets to bleed passages.

The non-uniform surface causes the vortices to leave or shed from the edges of the inlet at different positions with respect to the airflow direction.

In a conventional bleed arrangement in a gas turbine engine, a problem occurs due to the interaction between the breakup of the shear layer in the bleed passage inlet and an acoustic standing wave (or acoustic response) in the bleed system or cavity. At certain conditions the acoustic resonance frequency of the bleed system coincides with the natural frequency of a self-sustained shear layer instability in the shear layer at the bleed passage inlet. When this occurs, the induced unsteady pressure oscillations can adversely affect surrounding components such as the low pressure compressor (LPC) rotor stages and the bleed piping and valves. Vibrations within these components can be damaging to the engine and its operation.

The non-uniform profile may be selected from a variety of forms or shapes, each arranged to release or 'trip' a vortex from that edge. For example, serrations (zig-zag or triangular) shapes may be formed on the edges of the bleed passage inlet to generate a surface which trips vortices at different positions, more specifically different distances from the trailing edge of the bleed inlet along the direction of airflow.

Put another way, the non-uniform profile has some portions of its length (the length being measured in a perpendicular direction to the airflow) that are further downstream (measured along the duct) than other portions. Advantageously these portions may alternate so that an alternating profile is provided alternating between parts of the edge that are further down stream (in a flow direction along the duct) and some parts that are further upstream (in a flow direction along the duct). Thus, sinusoidal or zig-zag or even fractal or random edges can be realised.

The purpose of the serrations is to prevent a coherent build-up or roll-up of Rossiter modes in the shear layer between the main duct flow and the slower fluid within the bleed system or cavity. If the shear layer instability and coherent roll up is disturbed, the forcing mechanism for the acoustic resonance is removed. The solution can be composed of serrations of the slot leading edge which would break up the coherence of the Rossiter modes or of turbulence generators at the inlet leading edge which would affect the shear layer properties such that the Rossiter frequencies are shifted from the cavity resonance frequencies.

The trailing or the leading edge may be modified to include the non-uniform profile. For example, in one arrangement the trailing edge of the inlet may comprise a substantially uniform profile and the leading edge of the inlet may comprise a non-uniform profile. In another arrangement, the leading edge of the inlet may comprise a substantially uniform profile and the trailing edge of the inlet may comprise a non-uniform profile. The vortex shedding can thereby be optimised to reduce the risk of coherence in the shear layer instability. Additionally, or alternatively only a part of the edges may have the non-uniform profile. For example, some parts of the trailing edge or leading edge may have the non-uniform profiles described herein and other parts may be smooth or uniform. The shedding performance can thus be optimised for each engine design and operating parameters.

It will be recognised that the term non-uniform is not intended to cover microscopic or very small non-uniformities that would not influence airflow. Instead it is intended to refer to a modified surface profile that is sufficient to influence vortex shedding.

The shape or profile of the non-uniform surface may also be selected according to the operations parameters of the engine. For example, the non-uniform profile of the leading or trailing edge may be in the form of an undulating surface having portions which extend to a greater distance along the direction of airflow through the engine than other portions.

Thus, vortices are caused to be shed at different positions along the airflow direction. By releasing or shedding vortices at different positions the vortices are caused to interact in a less coherent manner rather than from a common, for example, straight or uniform surface or edge. The subsequent interactions as the vortices enter the airflow cause the vortices to lose coherence and any natural frequencies can be avoided or cancelled out.

In another arrangement the non-uniform profile of the leading or trailing edge may be in the form of serpentine or sinusoidal edges or even fractal or stochastic profiles.

In an example in which the bleed passage communicates with a plenum, the resonance is compounded by the plenum which is in fluid communication with the bleed passage and which receives bleed air from the duct via the bleed passage inlet. The plenum may, for example, be in the form of a circumferentially extending chamber surrounding a central portion of the engine. The plenum may additionally be a single volume or may be subdivided into a plurality of individual plenums. Acoustic resonance in the plenum may be abated by the inclusion of one or more outwardly extending projections extending into the plenum.

Such outwardly extending projections within the plenum may be in the form of a convex surface, the convex surface extending into a respective plenum.

The non-uniform profile or shape of the leading or trailing edges of the bleed passage inlet may, as described above, be any suitable shape.

The size of the trailing edge serrations may be related to the size of the Rossiter mode vortices. The leading edge serrations or vortex generators may be very small to generate turbulence or comparable to the Rossiter mode vortex sizes (~5% to 50% of the distance between the leading edge and trailing edge.)

In effect, as described herein, the non-uniform parts or portions of the leading and/or trailing edges are arranged to purposively, or deliberately, generate vortices within the engine. This in itself is counterintuitive.

Advantageously, the leading edge (LE) and trailing edge (TE) non-uniformities or undulations may have an amplitude that is 2-20% of the height of the duct measured perpendicularly across the channel immediately adjacent to the leading or trailing edge (this is represented by reference hc in FIG. 3A described below).

Furthermore, the leading edge (LE) and trailing edge (TE) non-uniformities or undulations may have an amplitude that is 2-50% of the length (in a flow direction along the duct) of the opening to the bleed passage. This is represented by reference L in FIG. 3B, described below.

Still further, the wavelength of the non-uniformities or undulations (that is the number of non-uniformities per unit length measured along the leading/trailing edge) may also advantageously be either:
 (i) 2-20% of the height of the duct measured perpendicularly across the channel immediately adjacent to the leading or trailing edge (this is represented by reference hc in FIG. 3A described below); or
 (ii) 2-50% of the length (in a flow direction along the duct) of the opening to the bleed passage (this is represented by reference L in FIG. 3B, described below).

In another arrangement, a portion of the leading edge or trailing edge of the inlet may be moveable with respect to an adjacent portion or portions of the inlet. Thus, the profile of the non-uniform part of the leading or trailing edge may be conveniently changed or modified by the relative movement. This may be achieved by a suitable actuator arrangement within the walls of the duct.

Additionally, or alternatively, a portion of the trailing edge of the inlet may be provided with an acoustic absorption material. Thus, flow disturbances striking the trailing edge which may be reflected as acoustic waves can be absorbed to enhance the acoustic performance of the engine. In one example, a portion of the trailing edge of the inlet may be provided with a porous material such as a foam or an acoustic liner such as Helmholtz resonator. The foam may be a porous metallic material which is semipermeable.

It will be recognised by someone skilled in the art that the components described herein are located around the core of the gas turbine engine, the engine having a principal axis of rotation. As such, each bleed or cavity inlet may have a generally arcuate shape and be coaxial with the principal axis of the engine.

Viewed from another aspect there is provided herein an intermediate compressor structure for a gas turbine engine, the intermediate compressor structure comprising at least one bleed passage allowing air to leave the compressor structure, the at least one bleed passage having an inlet defined between an upstream leading edge and downstream trailing edge, measured in a direction of flow of air through the engine, and wherein the upstream leading edge of the inlet or the downstream trailing edge of the inlet has a non-uniform profile.

Such a structure may be adapted to be positioned within an engine construction between a low pressure compressor and a high pressure compressor.

Viewed from yet another aspect, there is provided herein a method of modifying a gas turbine engine, the gas turbine engine comprising at least one radially extending bleed passage, the at least one bleed passage having an upstream inlet and an outlet for releasing air from the passage, wherein the inlet is defined between an upstream leading edge and downstream trailing edge, measured in a direction of flow of air through the engine, and wherein the method comprises the step of adapting the upstream leading edge of the inlet or the downstream trailing edge of the inlet so as to have a non-uniform profile.

Thus, a conventional gas turbine engine may be modified to incorporate a modified bleed passage as described herein whilst maintaining other engine components.

Viewed from another aspect there is provided herein a method of manufacturing an aero-engine, the aero-engine comprising at least one radially extending bleed passage, the at least one bleed passage having an upstream inlet and an outlet for releasing air from the passage, wherein the inlet is defined between an upstream leading edge and downstream trailing edge, measured in a direction of flow of air through the engine, and wherein the method comprises the step of adapting the upstream leading edge of the inlet or the downstream trailing edge of the inlet so as to have a non-uniform profile.

According to such a method the upstream leading edge of the inlet and/or the downstream trailing edge of the inlet may be adapted to comprise an undulating or generally serrated shape in an airflow direction through the duct of the engine. Furthermore the trailing edge of the inlet may be provided with an acoustic absorbing surface as discussed above.

DRAWINGS

Aspects of the disclosure will now be described, by way of example only, with reference to the accompanying figures in which.

Figure 1:
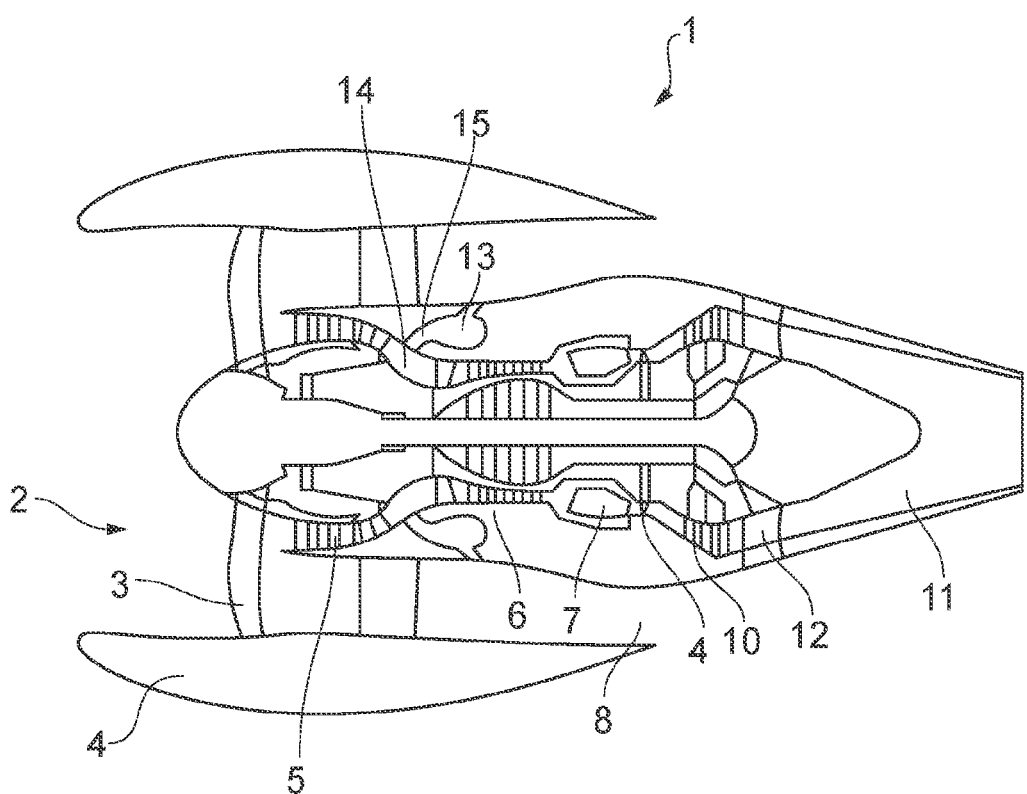
FIG. 1 shows a cross-section of a gas turbine engine incorporating a bleed system.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The invention is further described with reference to the following examples. It will be appreciated that the invention as claimed is not intended to be limited in any way by these examples. It will also be recognised that the invention covers not only individual embodiments but also combination of the embodiments described herein.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the spirit and scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

While the invention is susceptible to various modifications and alternative forms, specific embodiments are shown by way of example in the drawings and are herein described in detail. It should be understood however that the drawings and detailed description attached hereto are not intended to limit the invention to the particular form disclosed but rather the invention is to cover all modifications, equivalents and alternatives falling within the spirit and scope of the claimed invention It will be recognised that the features of the aspects of the invention(s) described herein can conveniently and interchangeably be used in any suitable combination

DETAILED DESCRIPTION

FIG. 1 shows a cross-section of a gas turbine engine 1 incorporating a bleed system shown generally by reference 13.

The bleed system may optionally comprise a plenum as described herein or may alternatively be in the form of a passage to allow for air communication but without a plenum. The present disclosure is applicable to an air bleed arrangement with and without a plenum.

The skilled person will understand the principal components of a gas turbine engine and their operation. In summary the engine 1 comprises an air intake 2 which permits air to flow into the engine to the fan 3 located at the upstream end of the engine. All of the components are housed within the engine nacelle 4.

The engine comprises a bypass channel downstream of the fan and a central engine core which contains the compressors, combustors and turbines. The core of the engine is formed of a first low pressure compressor 5 and a second high pressure compressor 6. There may also be an intermediate compressor. This multi-stage compressor arrangement takes air from ambient pressure and temperature to high temperature and pressure. Compressed air is then communicated to the combustion chamber 7 where fuel is injected and combustion occurs.

The combustion gases are expelled from the rear of the combustions chamber 7 and impinge first on a high pressure turbine 9 and then on a second low pressure turbine 10 before leaving the rear of the engine through the core nozzle 11. Thrust from the engine is created by two gas flows: a first from the fan nozzle 8 (receiving thrust from the fan) and secondly from the exhaust gases from the core nozzle 11.

A transition duct 14 is arranged to receive air from the low or intermediate pressure compressor 5 and communicate it radially inwards to be supplied to the high pressure compressor 6.

As shown all compressors are coaxial with the central axis of the turbine. The low/intermediate pressure compressor 5 has a larger outer radius (measured from the central axis of the compressor) than the outer radius of the high pressure compressor 6 because of the efficiency reasons (examples discussed above).

This requires that the duct or channel communicating air between the two compressors is a generally S-shaped to communicate the compressed air towards the central axis of the turbine and into the high pressure turbine 6.

As described herein, it is desirable to be able to release or bleed some air in the later stages of the low/intermediate compressor or within the transition duct out of the engine. The bleed can thus also be positioned between the last LPC rotor and its OGV, although in such designs the OGV are usually at the very inlet of the transition duct and can be considered to be in it/part of it. This may be used to control the amount of air being passed to the high pressure compressor and prevent a low pressure compressor stall, for example.

As shown in FIG. 1 an outlet 15 is provided which provides an openable passage allowing air to selectively flow from the transition duct 14 to an annular chamber, often referred to as a plenum.

The plenum may be arranged downstream of the low pressure compressor. Specifically, the plenum may be arranged radially outside of the core and the bleed passage is usually located downstream of the LPC.

The plenum is an annular chamber extending all or part of the way around the engine and arranged to receive air that is released from the main flow path. In effect the plenum acts as a collecting chamber or reservoir for air released from the main flow path.

Figure 2A:
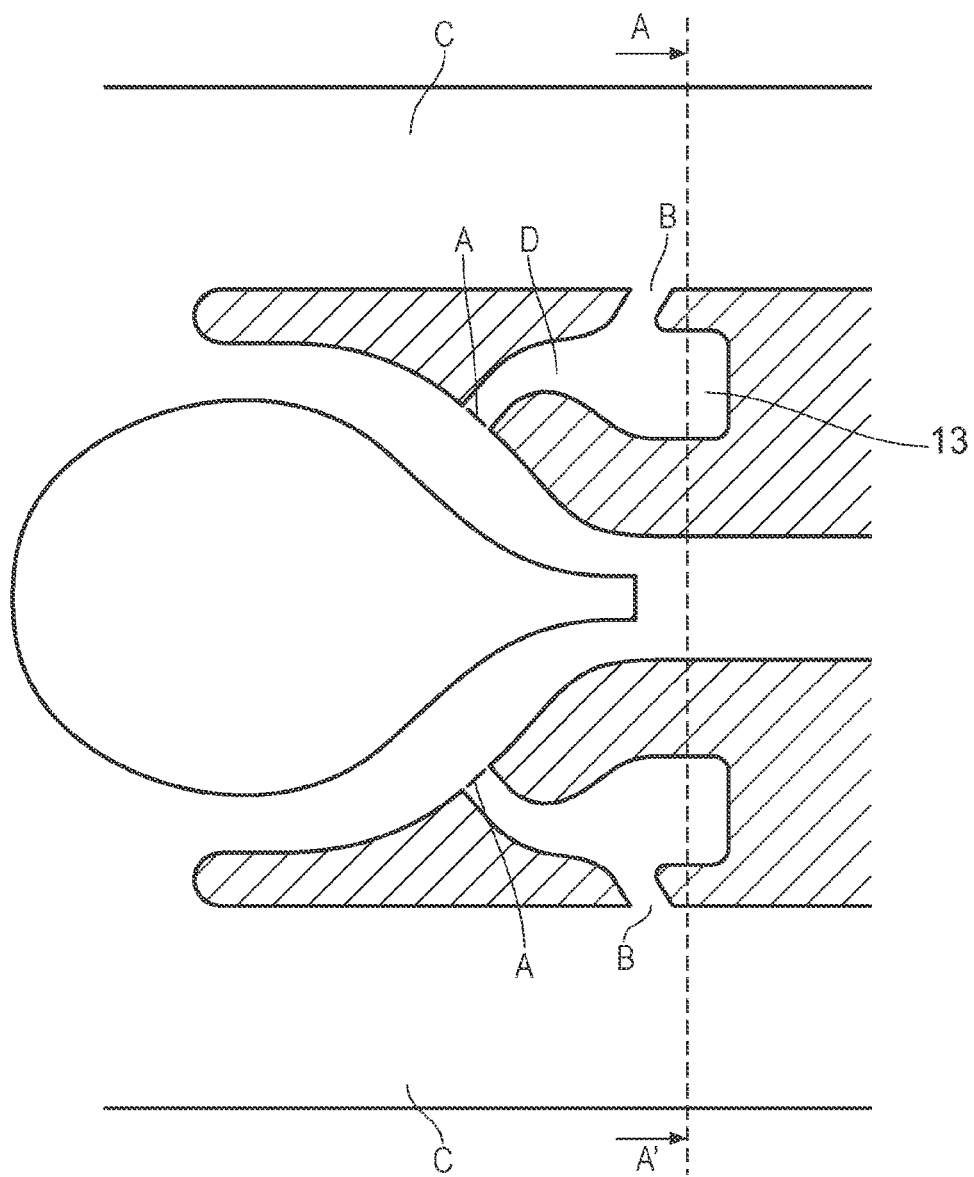
FIG. 2A show cross-section through an aero-engine bleed system.

FIG. 2A illustrates an enlarged cross-section view of the bleed system and its position with respect to the core flow or main flow path and the transition duct. The air passes into the plenum in a conventional engine by means of the bleed passage connected to the main flow path at the location A. Air then leaves the plenum through a port or valve B proximate to the bypass channel C of the engine. There are also other arrangements with the valve located at the end of the bleed off-take pipe D before the air enters the plenum.

Figure 2C:
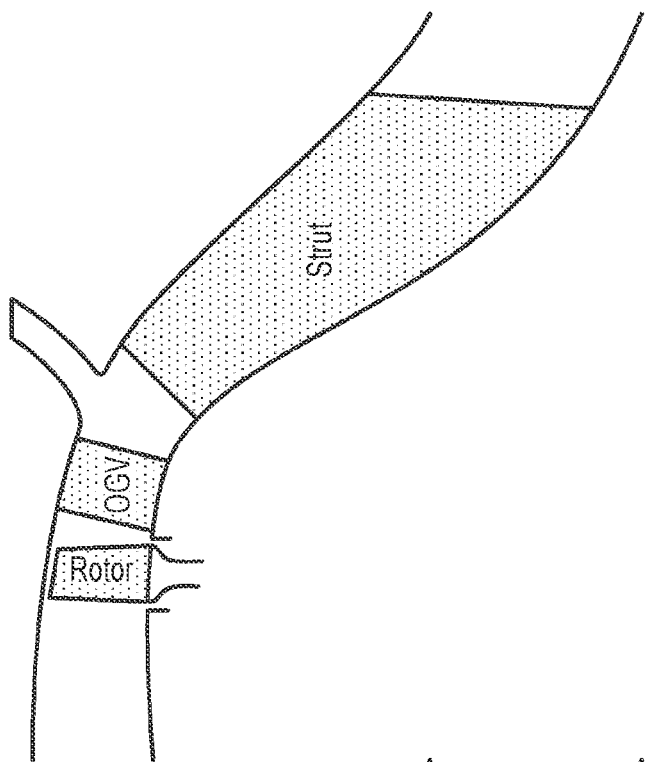
FIGS. 2B and 2C show an application to a plenum and non-plenum bleed arrangement.
Figure 2B:
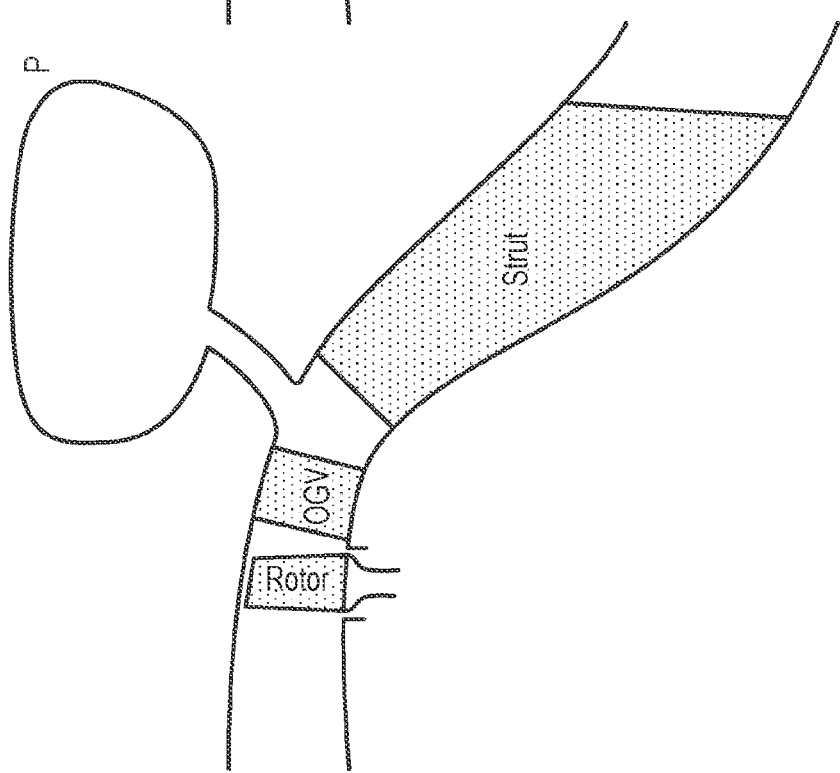

FIGS. 2B and 2C show arrangements with and without the plenum respectively. The plenum (P in FIG. 2B) forms an annular chamber into which air can be communicated and then released. FIG. 2C shows an arrangement with an air passage but without the plenum.

Figure 3B:
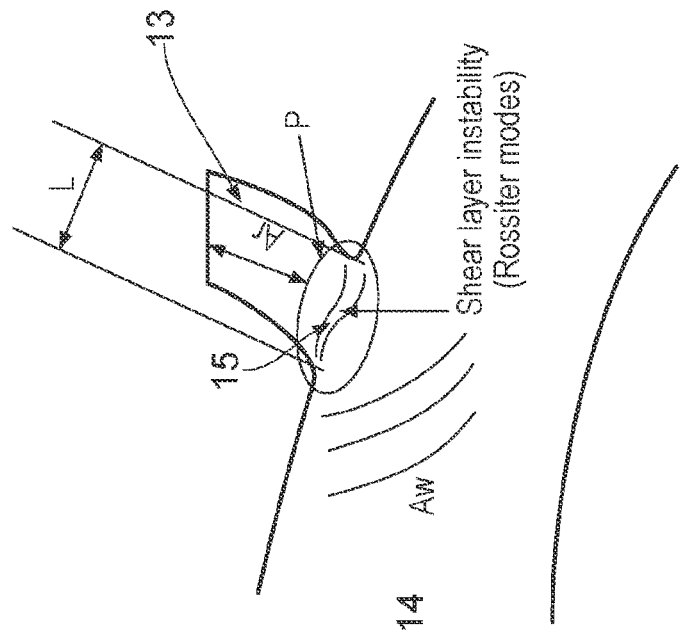
FIGS. 3A and 3B show a cross-section through a plenum and non-plenum arrangement respectively.
Figure 3A:
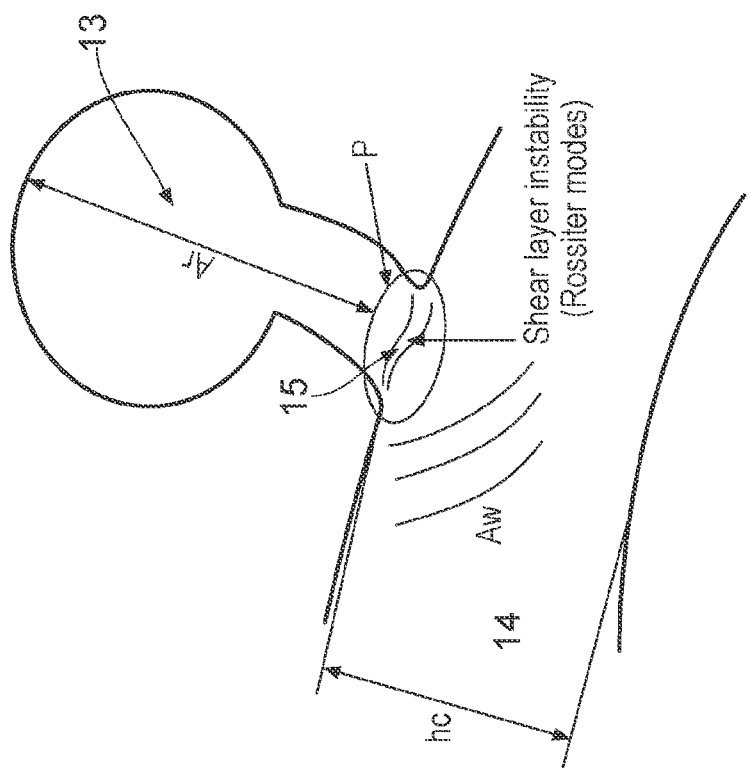

FIGS. 3A and 3B show a cross-section through the duct, the bleed passage and a plenum (FIG. 3A shows a plenum in communication with the bleed passage and FIG. 3B shows a bleed passage alone in communication with the duct). It will be recognised that the plenum may be in the form of a torus extending around the engine and coaxial with the axis running along the engine core. The plenum may be a continuous chamber or may be a number of discrete chambers each performing the same function of collecting released air. Similarly the bleed passage inlet may be a substantially continuous annular shape.

As shown schematically in FIGS. 3A and 3B, air passing through the main flow path 14 can induce flow phenomena such as shear layer instability (Rossiter Modes) at the inlet of passage 15, or transport flow phenomena from the upstream compressor to the inlet of passage 15, which then interacts with the bleed cavity 13. Disadvantageously a coupling effect can occur at point P where there is a coupling between the cavity acoustics of the plenum and the Rossiter modes of the air passing over the inlet to the passage.

The present disclosure is concerned with the aero-acoustic effects of this arrangement and how airflow in the main flow path can create unwanted acoustic waves $A_w$ and vibrational effects within the bleed system and engine (such as the low pressure compressor LPC).

The bleed cavity 13 defines a volume with characteristic resonant frequencies $F_r$ which depend on various factors of the bleed design and volume. The air in the main gas path passing over the inlet of the bleed passage 15 can cause excitation of air within the plenum at, for example, a frequency $F_e$.

In situations where the excitation frequency is close to or equal to a resonant frequency (i.e. when $F_r = F_e$) acoustic resonance $A_r$ may occur within the plenum creating highly undesirable aero-acoustic effects and potentially damaging vibrations within the engine.

The frequencies at which this resonance may occur will depend on operating conditions of the engine and the acoustic characteristics of the plenum.

As discussed above the interaction between the acoustic property of the bleed system and the acoustic effects of airflow over the inlet to the bleed passage generates significant issues in engine noise, pressure loss and vibration.

Referring specifically to the airflow over the inlet, the shear layer over the inlet to the passage is naturally unstable. The instability will grow as the shear layer develops over the opening causing an oscillation of the shear layer. The oscillating shear layer will create an unsteady force when it hits the trailing edge of the opening.

The unsteady force will in turn create an acoustic wave that propagates away from the trailing edge. The acoustic wave will, under the right conditions, reinforce the initial shear layer instability and amplify the shear layer oscillation. The amplified oscillation will in turn create even stronger forces on the opening trailing edge and stronger acoustic response, and so on. The feedback loop, which will have specific frequencies depending on the opening geometry (e.g., length of the opening) and flow condition (e.g., speed and temperature), are known as Rossiter modes.

The cavity created by the opening in the gas path has specific acoustic resonance frequencies. At particular conditions, the natural frequencies of the shear layer oscillations and the acoustic resonance frequency of the cavity will be close enough to create a feedback loop between the acoustic response in the cavity and the Rossiter modes. The amplitudes of the radiated acoustic waves can then become very strong and result in high transient loading of engine components such as compressor blades.

The present disclosure reduces or eliminates the strong acoustic forces by breaking or weakening the feedback loop in the Rossiter modes.

The feedback loop can be broken at the leading or trailing edge of the cavity by modifying the geometry so that the length of the opening is varying along the edge and thereby weakening the coherence of the shear layer oscillation (The Rossiter mode).

Another way to weaken the feedback is to modify the trailing edge in a way that the acoustic pulse from the shear layer impinging on the trailing edge is weakened. This can be done by treating the trailing edge with an acoustic liner (Helmholtz resonators) or a porous material (e.g. a foam).

Yet another way of weakening the formation of Rossiter modes is to modify the leading edge using small geometrical features such as vortex generators or flow tripping devices to change the initial condition of the shear layer in the opening to the bleed. These are illustrated in FIG. 4 by triangles 18.

Figure 4:
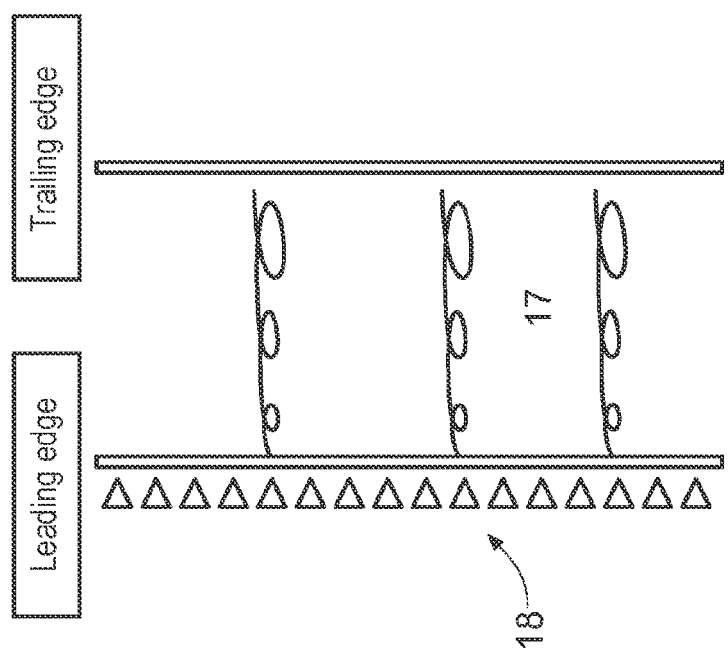

FIG. 4 illustrates an air bleed passage arrangement. Here the leading edge LE has a straight line profile 16 i.e. a substantially uniform shape or profile. The triangles 18 indicate the tripping devices at the leading edge. The shown vortices 17 are created as the air breaks away from the edge of the inlet. The vortices travel towards the TE. As shown the vortices 17 are substantially similar and all reach the TE simultaneously and travel across the width of the inlet at the same speed. This conformity of vortices allows for the Rossiter modes to be enhanced and resonance can then occur. As discussed above a feedback loop can be quickly generated creating unwanted pressure waves, vibration and noise. This is further compounded by the interaction of the Rossiter modes with the acoustic properties of the plenum (described above). The impact of the tripping devices 18 is to disrupt the formation of coherent vorticies causing the feedback loop involved in the Rossiter modes.

Figure 5:
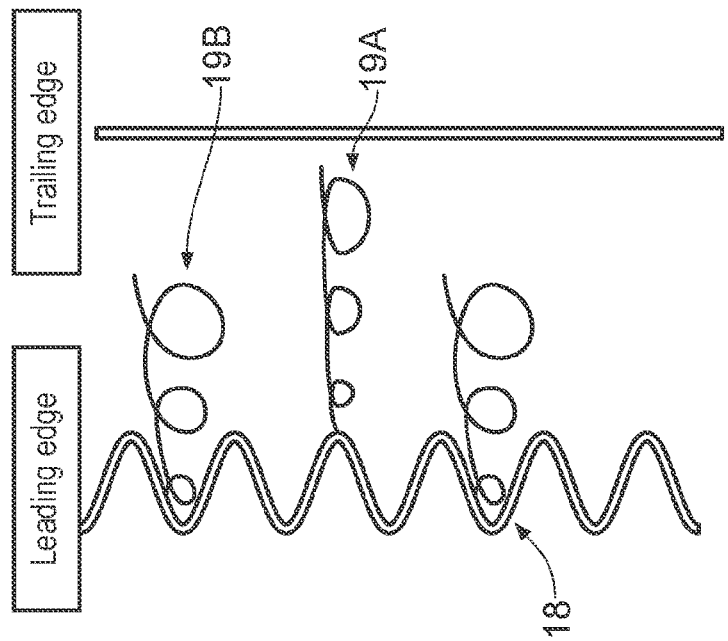
FIGS. 4 and 5 shows a modified bleed leading edge arrangement.

FIG. 5 shows a modified air bleed inlet according to the present disclosure. Here, the leading edge LE has been provided with a serrated or undulating surface 18 having some portions which extend further (axially or radially) than others. Specifically, the peaks of the undulations or sine wave are spaced from the troughs by an amplitude of x. This amplitude x is the distance between the maximum and minimum of the undulation As shown in FIG. 5, vortex 19A commences or leaves the leading edge at an earlier point than vortex 19B. The two vortices 19A, 19B therefore travel across the inlet width and arrive at the trailing edge TE at different times. Consequently, the adjacent vortices do not constructively interfere with each other and resonance can be avoided.

Figure 6:
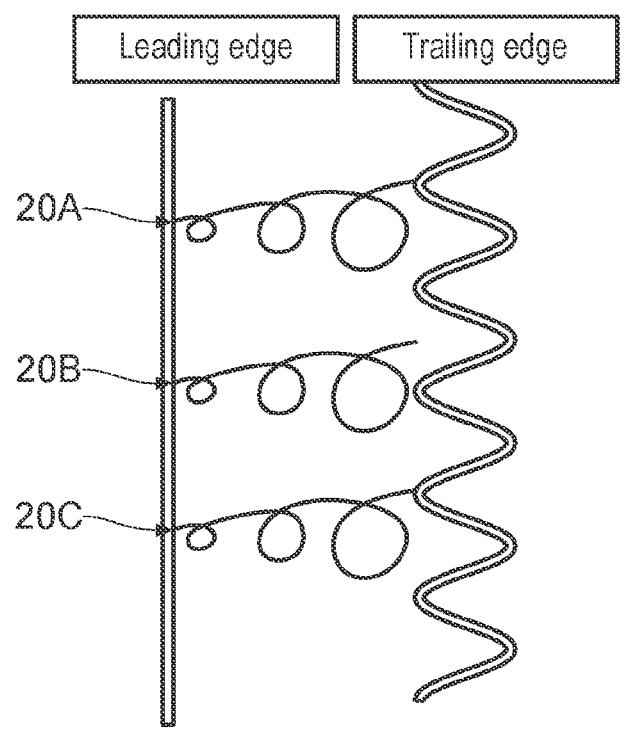
FIG. 6 shows a modified bleed trailing edge arrangement.

FIG. 6 shows an alternative arrangement in which the leading edge LE is uniform i.e. un-modified and the trailing edge TE is modified. In this example the trailing edge is provided with a serrated or undulating profile. Here, although vortices 20A, 20B, 20C leave the leading edge at the same point they meet the trailing edge at different points, specifically different distances along the airflow direction of air passing across the inlet. The vortices impinge on the undulating trailing edge in FIG. 6 at different positions measured from left to right in FIG. 6, owing to the undulating profile. The dissimilar impacts of the vortices on the modified trailing edge are not coherent and so resonance is prevented.

Figure 7A:
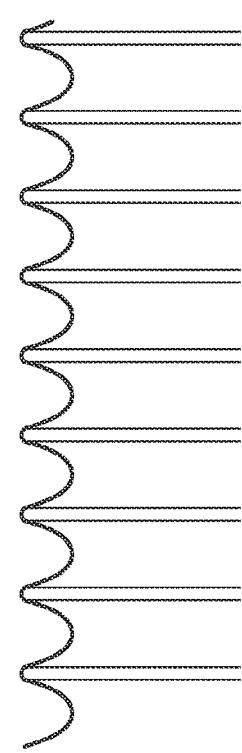
FIGS. 7A, 7B and 7C show an example undulating profile trailing edge.
Figure 7B:
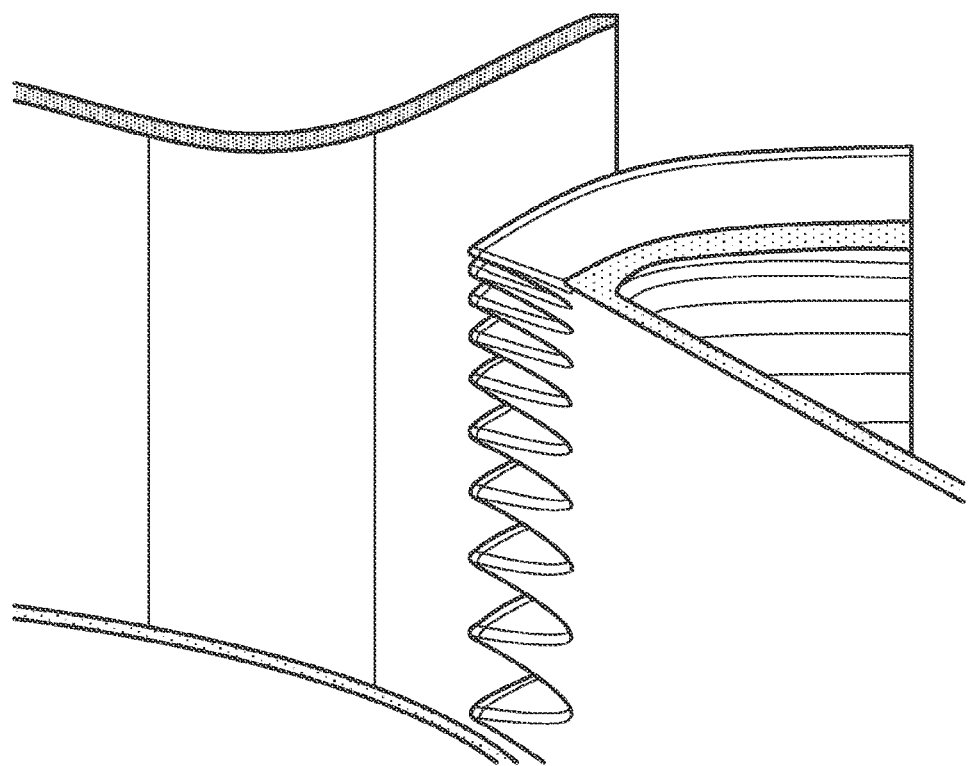
Figure 7C:
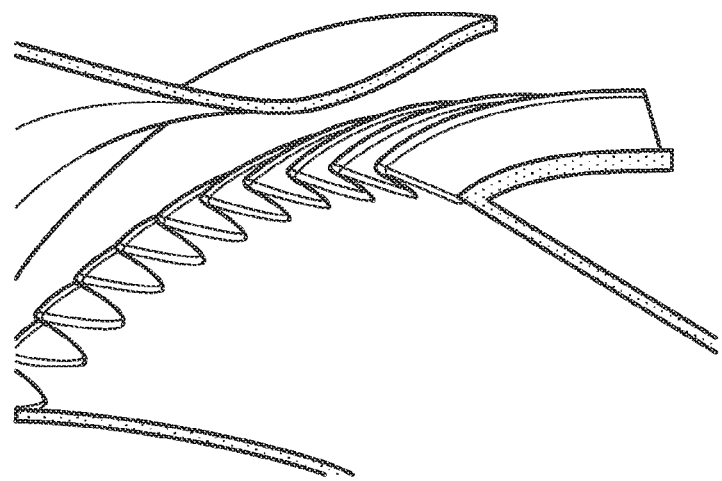

FIGS. 7A, 7B and 7C show an example undulating profile trailing edge. In each of the examples the trailing edge comprises a non-uniform trailing edge in the form (in these examples) of a plurality of adjacent concave recesses.

As shown the bleed passage entrance may be curved as shown in FIG. 7C with corresponding curve non-uniform trailing edge profile. The non-uniform recesses may also optionally taper along the inner surface of the bleed passage.

The invention claimed is:

1. A gas turbine engine component, comprising:
a duct including at least one generally radially extending bleed passage in fluid communication with an outlet for releasing air from the duct,
wherein the bleed passage has an inlet in fluid communication with the duct, the inlet being defined between an upstream leading edge and downstream trailing edge arranged facing each other along a direction of flow of air through the duct,
wherein the upstream leading edge of the inlet has a non-uniform profile extending into the inlet and the bleed passage along the direction of flow of air through the duct, or the downstream trailing edge of the inlet has a non-uniform profile extending into the inlet and the bleed passage along the direction of flow of air through the duct, and
wherein the non-uniform profile of the upstream leading edge of the inlet or the downstream trailing edge of the inlet is in the form of an undulating surface having portions which extend to a greater distance along the direction of airflow through the duct than other portions.

2. The engine component of claim 1, wherein the trailing edge of the inlet comprises a substantially uniform profile and the leading edge of the inlet comprises the non-uniform profile.

3. The engine component of claim 2, wherein the leading edge of the inlet comprises vortex-generating surface profiles.

4. The engine component of claim 1, wherein the leading edge of the inlet comprises a substantially uniform profile and the trailing edge of the inlet comprises a non-uniform profile.

5. The engine component of claim 1, wherein the non-uniform profile of the leading or trailing edge includes a serpentine, sinusoidal, triangular, or stochastic edge.

6. The engine component of claim 1, wherein a portion of the leading edge of the inlet is moveable with respect to an adjacent portion or portions of the inlet to change the profile of the leading edge.

7. The engine component of claim 1, wherein a portion of the trailing edge of the inlet is moveable with respect to an adjacent portion or portions of the inlet to change the profile of the trailing edge.

8. The engine component of claim 1, wherein the leading edge and/or trailing edge non-uniformities has an amplitude that is 2-20% of the height of the duct measured perpendicularly across the channel immediately adjacent to the leading or trailing edge of the inlet.

9. The engine component of claim 1, wherein the leading edge and/or trailing edge non-uniformities has an amplitude that is 2-50% of the length in a flow direction along the duct of the inlet opening to the bleed passage.

10. The engine component of claim 1, wherein the wavelength of the non-uniformities is the number of non-uniformities per unit length measured along the leading/trailing edge is also either:
(i) 2-20% of the height of the duct measured perpendicularly across the channel immediately adjacent to the leading or trailing edge;
(ii) 2-50% of the length in a flow direction along the duct of the opening to the bleed passage.

11. The engine component of claim 1, wherein a portion of the trailing edge of the inlet is provided with an acoustic absorption material.

12. The engine component of claim 11, wherein the portion of the trailing edge of the inlet is provided with a porous material.

13. The engine component of claim 1, wherein a portion of the trailing edge of the inlet is provided with an acoustic liner.

14. The engine component of claim 1, wherein the leading edge and a trailing edge are curved along a direction extending into the inlet.

15. An intermediate compressor structure for a gas turbine engine, the intermediate compressor structure comprising:
at least one bleed passage allowing air to leave the compressor structure, the at least one bleed passage having an inlet defined between an upstream leading edge and downstream trailing edge arranged facing each along a direction of flow of air through the duct;

wherein the upstream leading edge of the inlet has a non-uniform profile extending into the inlet and the bleed passage along the direction of flow of air through the duct, or the downstream trailing edge of the inlet has a non-uniform profile extending into the inlet and the bleed passage along the direction of flow of air through the duct, and wherein the non-uniform profile of the upstream leading edge of the inlet or the downstream trailing edge of the inlet is in the form of an undulating surface having portions which extend to a greater distance along the direction of airflow through the duct than other portions.

16. The intermediate compressor structure of claim 15, wherein the leading edge and a trailing edge are curved along a direction extending into the inlet.

17. A method of manufacturing an aero-engine, the aero-engine comprising at least one radially extending bleed passage, the at least one bleed passage having an upstream inlet and an outlet for releasing air from the passage, wherein the inlet is defined between an upstream leading edge and downstream trailing edge arranged facing each along a direction of flow of air through the duct, and wherein the method comprises:

adapting the upstream leading edge of the inlet or the downstream trailing edge of the inlet to have a non-uniform profile extending into the inlet and the bleed passage along the direction of flow of air through the duct, wherein the non-uniform profile of the upstream leading edge of the inlet or the downstream trailing edge of the inlet is in the form of an undulating surface having portions which extend to a greater distance along the direction of airflow through the duct than other portions.

18. The method of claim 17, wherein the upstream leading edge of the inlet and/or the downstream trailing edge of the inlet are adapted to comprise an undulating shape in the airflow direction through the duct.

19. The method of claim 17, wherein the trailing edge of the inlet is provided with an acoustic absorbing surface.

20. The method of claim 17, wherein the leading edge and a trailing edge are curved along a direction extending into the inlet.

* * * * *